United States Patent [19]
Baker

[11] 3,967,772
[45] July 6, 1976

[54] REUSABLE CONTAINERS FOR CITRUS FRUIT AND THE LIKE

[76] Inventor: Howard W. Baker, Box 11, Rte. 1, Terra Bella, Calif. 93270

[22] Filed: Jan. 22, 1975

[21] Appl. No.: 542,951

[52] U.S. Cl. ................................. 229/18; 53/29; 229/15; 229/6 A
[51] Int. Cl.² ........................................ B65D 21/02
[58] Field of Search .............. 229/18, 23 R, 23 A, 229/6 A, 15; 53/29

[56] References Cited
UNITED STATES PATENTS

| | | | |
|---|---|---|---|
| 1,609,696 | 12/1926 | Cleveland | 229/15 |
| 2,021,208 | 11/1935 | Stouffer | 229/6 A |
| 2,304,373 | 12/1942 | Palmer | 229/23 R |
| 2,426,883 | 9/1947 | Kartyshai | 229/15 X |
| 2,745,587 | 5/1956 | Landerlugt, Jr. | 229/15 |
| 2,809,775 | 10/1957 | White | 229/6 A X |
| 3,185,379 | 5/1965 | Kohlhaas | 229/15 X |
| 3,403,835 | 10/1968 | Schwaner | 229/15 |

*Primary Examiner*—Davis T. Moorhead
*Attorney, Agent, or Firm*—Burns, Doane, Swecker & Mathis

[57] ABSTRACT

A collapsible and reusable container is formed from a foldable base member, a collar and divider members made of a fibrous paperboard sheet material especially adapted for citrus fruit. The central base portion has an area encompassed by fold lines which define a hexagon. Each of the divider members constitutes a complete triangle to subdivide the base area into triangular compartments. The corners of the divider members reinforce the corners of the base member side walls. The collar encircles the outer surface of the side walls of the base member, also reinforces the side wall members and corners, and urges the divider members tightly together thereby forming a rigid container structure. Hand engaging openings in the side walls and openings in the central base portion and dividers provide ventilation. The entire container can be disassembled and the parts all folded flat for return and storage awaiting reuse.

11 Claims, 12 Drawing Figures

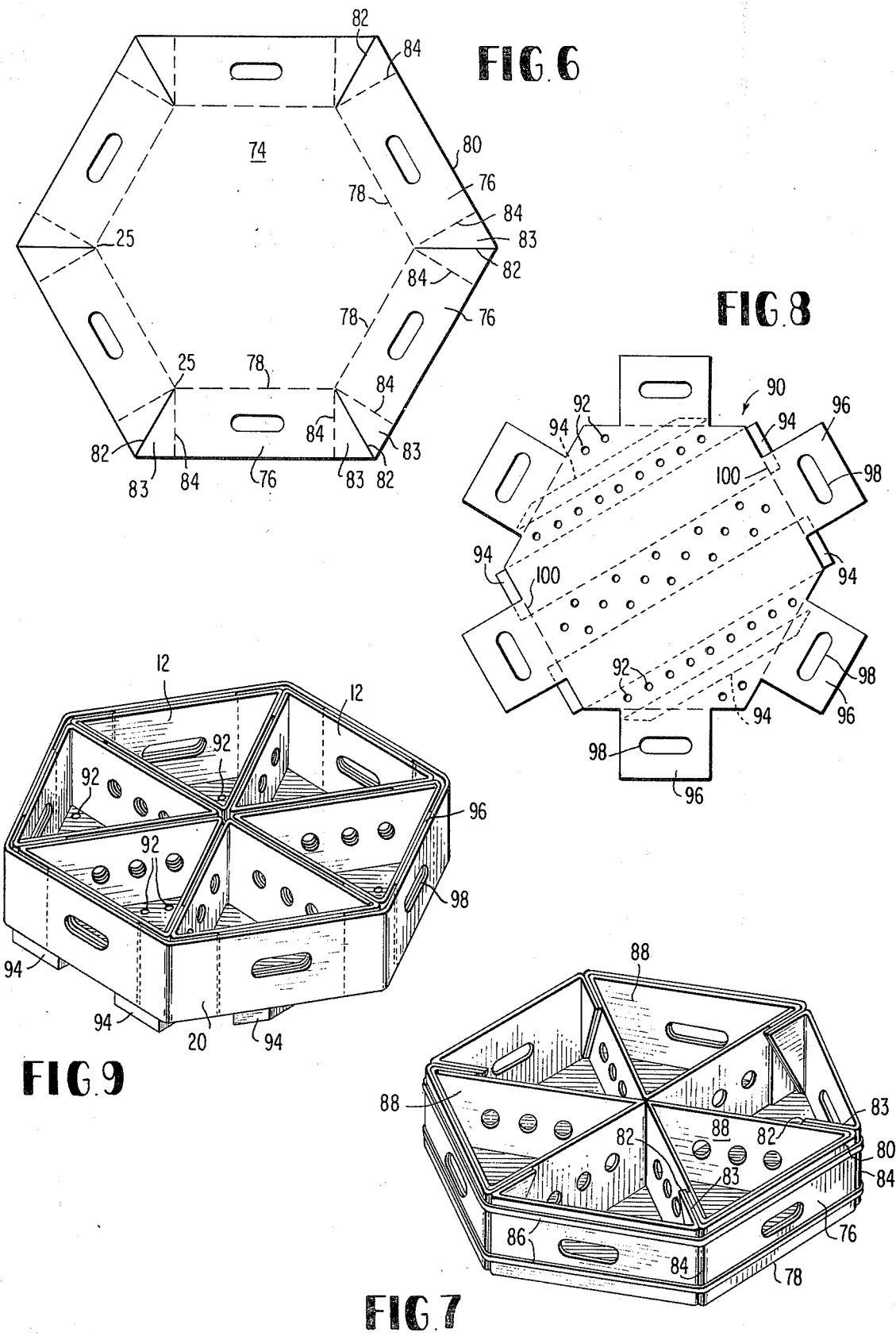

REUSABLE CONTAINERS FOR CITRUS FRUIT AND THE LIKE

This invention relates to knockdown containers made of a non-metallic material such as paperboard which are adapted for reuse. The containers may be taken apart after use, returned and stored in a flattened condition and readily assembled when needed for reuse.

BACKGROUND OF THE INVENTION

In the case of known containers for bulk storing and shipping of citrus fruit for example, a traditional structure has been that of a rigid rectangular box formed of pressed fibrous materials or corrugated paperboard and which is folded and in some cases glued, stapled or bound together in such manner as to impart structural rigidity to the box. Such boxes customarily have not been capable of being returned easily to a flattened condition for return and reassembly for re-use.

Another major disadvantage of such prior art containers is the fact that they provide little vertical support for stacking. Because of the lack of vertical support strength in the container side walls, stacking of the boxes is limited and often results in damage to the contents of the lowermost box in the stack.

Yet another disadvantage of the prior art containers is their inherent size limitations. It is well known that an increase in the size of a container provides for a more efficient utilization of container material in relation to the weight of the contents enclosed therein. When formed of corrugated paperboard material, the box structure of the prior art containers have traditionally been of a limited size since any substantial increase in the size of the container reduces its structural integrity.

In U.S. Pat. No. 2,969,903 to Keith, a different type of container is disclosed which has a hexagonal shape and is of a unitary construction with sloping side walls of double walled construction. Such a construction does not provide an efficient use of container material and does not safely allow stacking of the containers. U.S. Pat. No. 2,304,373 to Palmer discloses a further hexagonal package having an outer collar adapted for use with a single unitary product, and is clearly not adapted for handling many small items such as citrus fruit, nor can the structure be used in containers holding up to 200 pounds.

It is accordingly an object of the present invention to provide a novel collapsible container capable of handling up to about 200 pounds of produce such as citrus fruit which is readily set up for use by relatively inexperienced labor, and which is readily dismantled for reshipment in a collapsed form.

Another object of the invention is to provide a novel reusable container of comparably large size which is made of a non-metallic sheet material which can be shipped and stored in collapsed form to the using site and be easily assembled without the use of glue, staples or other permanent securing technique. In addition, the container, by reason of the presence of tightly fitting divider members and the coaction of an encircling tension member such as a collar, has improved resistance to sagging when lifted, and improved vertical strength so that the containers are fully capable of supporting one or more similar containers stacked one on the other without racking or twisting and without placing any load on the contents.

A further object is to provide a novel container structure which allows for as much as a 50% increase in the weight of contents while utilizing approximately the same amount of container material as has been traditionally used without compromising the integrity of the container structure.

A still further object of the invention is to provide a well ventilated container structure with sufficient lateral strength to provide a reduced susceptibility to racking even when the container is underneath and supporting one or more other containers, and formed with integral bottom and side wall members together with tightly fitting triangular inserts in the form of novel divider members all surrounded by an exterior tension member or collar. A foldable vertical support member secured at one end to the central base portion may be folded over the top of a divider member to reduce sagging of the base member. The container of the present invention allows for tight packing of one against the other in a truck, railway car, ship deck or cold storage room while providing open spaces including an uncovered top to afford ventilation to prolong the life and value of the shipped product. In addition, hand engaging openings may be provided in the side walls to allow two or more persons to lift the loaded containers. Optionally, spaced risers may be provided on the lower surface to allow use of fork lift trucks to handle the container, and the upper surface may be left open.

These and other objects and features will be apparent from the claims, and from the following description when read in conjunction with the accompanying drawings.

BRIEF DESCRIPTION OF THE DRAWINGS

FIG. 6 is a plan view of an alternative base member blank according to the invention;

FIG. 7 is a pictorial view of a container using the base member blank of FIG. 6;

FIG. 8 is a plan view of a still further base member blank according to the invention; and FIG. 9 is a pictorial view of a container using the base member blank of FIG. 8.

DESCRIPTION OF THE PREFERRED EMBODIMENT

Figure 1:
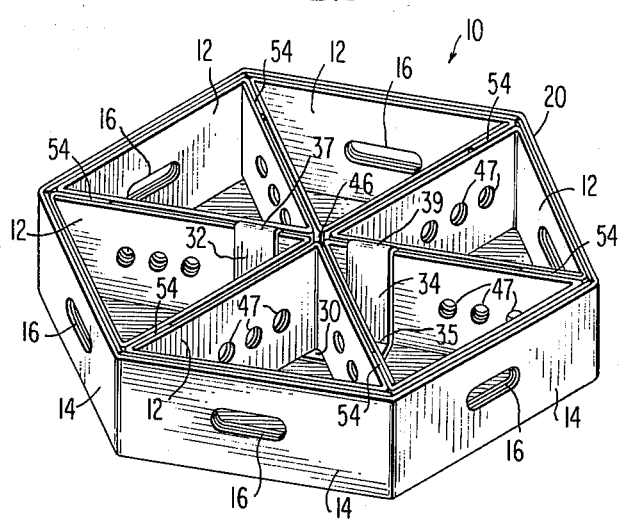
FIG. 1 is a pictorial view of a container embodying the present invention.
Figure 3A:
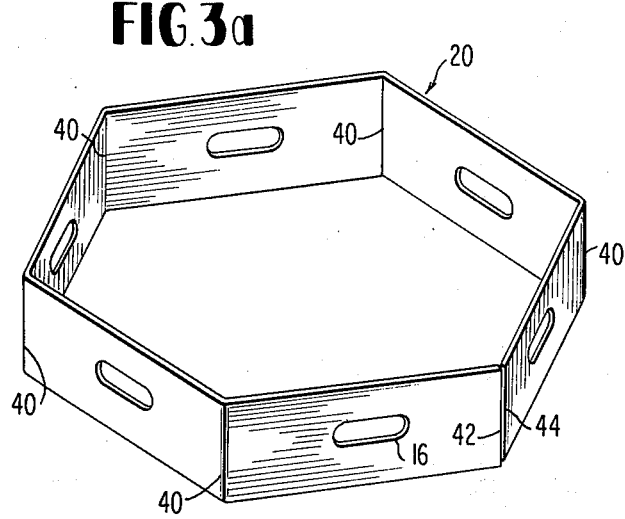
FIG. 3 is a pictorial view of a collar utilized in the container of FIG. 1.
FIGS. 3b and c are similar views of the collar of FIG. 3a in alternative positions folded for storage or for shipping with the container folded flat.
Figure 3C:
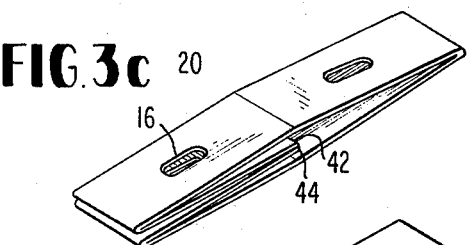
Figure 3B:
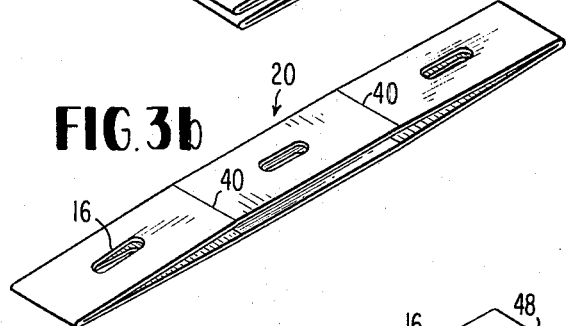
Figure 4A:
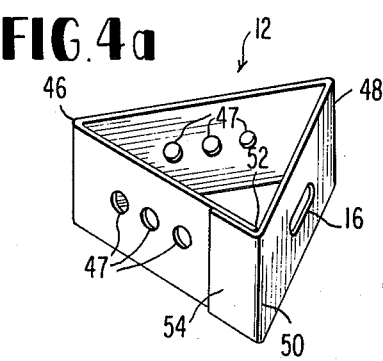
FIG. 4a is a pictorial view of an internal compartment divider member folded in a triangular configuration.

Referring now to the drawings, and particularly to FIGS. 1 through 4, the container 10 illustrated in FIG. 1 has a hexagonal shape with six compartments each defined by divider members 12 that have a triangular shape and are shown individually in FIG. 4a. The container as illustrated is adapted for use in storing and shipping citrus fruit. The six side walls 14 may each have a length of about 20 inches and height of about 11 inches. With the use of a non-metallic foldable sheet material such as paperboard commonly used in citrus containers, this container requires approximately 56 square feet of material which is about the same as required in four standard 16 × 11 × 11 inch containers traditionally used for storing and shipping of citrus fruit. This size is preferred for its handling properties as applied to citrus fruit, and will carry approximately 200 pounds.

Since each of the six compartments in the container 10 shown in FIG. 1 will hold about 36 pounds of citrus fruit as compared with about 38 pounds in the standard 16 inch container, each of the six compartments holds nearly as much fruit as one prior rectangular container. Hand-engaging slots 16 are preferably provided on each side so that two persons working together can readily move a filled container. Where the containers are used for handling citrus, slots 16 also provide for air circulation. The container does not need a cover. When loaded in a trailer or railway car, the abutting side walls of adjacent containers have aligned slots 16 to thus give good ventilation. In addition, the central base portion may, if desired, have a plurality of small ventilation openings 23 as shown in FIG. 2.

Figure 2:
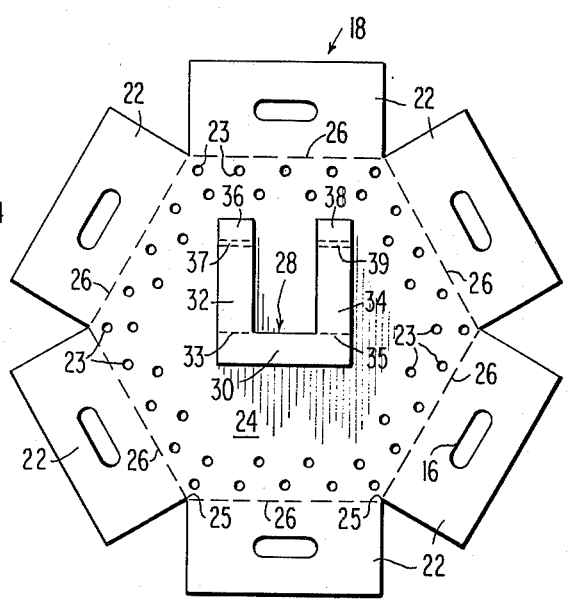
FIG. 2 is a plan view of the base member blank of the container illustrated in FIG. 1.
Figure 4B:
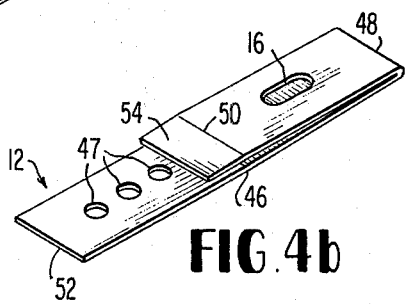
FIG. 4b is a pictorial view of the divider member of FIG. 4a in the collapsed position.

The container of FIG. 1 is formed essentially of three parts, the base member 18 as shown in FIG. 2, a tensioning member or collar 20 as shown in FIGS. 3a–c, and six triangularly shaped, divider members 12, one being shown in FIGS. 4a and 4b. While it is contemplated that the preferred material for all parts is corrugated paperboard as traditionally used for citrus containers, the invention allows for use of other materials such as synthetic plastic, Philippine mahogany, or fibrous sheet material with hinges substituted for fold lines, if desired.

The base member 18 of FIG. 2 is shown as a blank having side wall members 22 cut as illustrated and joined to the central base portion 24 by fold lines 26 which define a regular polygon, or in this case, a hexagon. The side wall members 22, being a homogeneous part of the base member, provide a continuous unitary structure for the side wall members 22 and the base portion 24 of the container. Perforations or small holes 23 may be provided to enhance air circulation.

As also shown in FIG. 2, a center portion support member 28 may be provided and comprise a rectangular base 30 that is permanently attached to the upper surface of the central base portion as by an adhesive or fasteners, or both. Two arms 32 and 34 may be formed as an integral part of base 30 and joined thereto by fold lines 33 and 35 which lie along a diagonal of the base member. Top ears 36 and 38 are located at the free ends of arms 32 and 34 and joined for 180° bending as by two pairs of fold lines 37 and 39, also shown in FIG. 1. The addition of support member 28 which is secured at its lower end to the approximate center of the base member and which has ears 36 and 38 folded over the divider members 12 as illustrated in FIG. 1, gives additional strength against bowing or bending, which may be desirable for those containers adapted to be lifted by hand.

Referring now to FIG. 3, the tension member or collar 20 is formed to fit tightly around the base member 18 when the side wall members 22 are folded in their upright position. Collar 20 may thus be formed from a single strip or band of the same material as used for the base member 18, with fold lines 40 located as illustrated in FIG. 3a and the two ends 42 and 44 joined by a suitable tape. Each section of collar 20 may be formed with hand engaging slots 16 as illustrated to be in alignment with the slots 16 in the side wall members 22.

FIG. 3b shows the collar 20 folded into a flattened condition. FIG. 3c shows the same collar folded in a different manner to reduce its length to about 40 inches as compared with a length of about 60 inches when folded as shown in FIG. 3b. To avoid weakening the collar due to repeated folding each time the container is disassembled and shipped flat, suitable means of reinforcing such as adhesively coated tapes, may be provided. Each corner of the collar when extending the full height of the container serves as a reinforcing pier and provides a substantially uniform force along the side wall members 22 in opposition to the force resulting from the contents within the container.

Referring now to FIGS. 4a and 4b, the divider member 12 may be folded from a flat blank which may be of the same material from which the base member 18 is formed. Divider member 12 is illustrated as being formed with three fold lines to form corners 46, 48 and 50. One end 52 is at corner 50 to provide a substantially rigid, triangularly shaped compartment.

One side between corners 48 and 50 has a slot 16 and is shown in FIG. 1 to be mounted along the flat wall section which has the slot 16. Where the container is contemplated for use with produce, the other sides may be provided with ventilating apertures 47 that allow for air flow from one compartment to another. The combined areas of the apertures should be substantially equal to the area of the slot 16.

The length of the divider member blank is preferably sufficiently long so that the portion 54 constitutes an overlap to provide an extra layer of material at an outside corner of the container which gives added strength where the container is intended for vertical loading against the divider members, as occurs when containers are stacked one on top of another.

As best shown in FIG. 1, the corner 46 for each divider member 18 is located at the approximate midpoint of the container 12. The overlap portion 54 for each divider member 16 is located at a different corner around the hexagonal container 10. The overlap portion 54 is preferably oriented along a diagonal of the base to be between two adjacent divider member walls. By making the height of the divider member 16 substantially the same as the height of the side wall members 22, all of the upper edges lie essentially in a common plane and thus share the load from any containers stacked above. Advantageously, the collar 20 can be made to have a similar height dimension so that it, too, can share in any vertical load.

By providing a number of divider members 12 equal to the number of sides of the base, as illustrated in FIG. 1, the wall sections of the divider members 12 disposed along the diagonal lines of the base member will provide a double thickness of flat sheet material along the diagonals of the container. This greatly enhances the capabilities of the container to avoid sagging in the middle. The disposition of the divider members also improves the vertical support capabilities of the container since the dual wall sections of the divider members are closely spaced at the center of the base. Thus, vertical load support by the divider members is quite effective at the center of the base member 18 where support is most needed.

FIG. 4b shows the divider member in its flattened condition with only one fold at corner 48. Use of adhesive or tape at end 52 is not required. This allows the divider members 12 to be folded substantially flat to reduce the space requirements for storage and shipping empty.

For assembly, the base member blank is placed on a horizontal surface and the side wall members 22 folded to an upright position. Collar member 20 can then be placed over the top of the upstanding side wall member 22 in an encircling relationship. Thereafter, the divider members 12 are placed in their positions as illustrated in FIG. 1. As the divider members are being placed in position, the arms 32 and 34 of the support member are lifted to a vertical position and the ears 36 and 38 folded downwardly to be between two adjacent divider members as illustrated. No adhesive or staples are required. The container is then ready for loading which may be done in the field for field-pack shipments as readily as in the permanent packing facility.

In the case of citrus fruit, there is no need for a cover since the compartments are all sufficiently small that there will be no spilling or shifting of the contents in the course of normal handling. Since citrus fruit is not intended to be loaded above the top edges of the divider members, the containers can be stacked one on top of the other for storage and for shipment. The slots 16 not only provide an easy means of engaging the container by hand, but also provide an important function allowing air circulation to the fruit in the container.

After the container has been emptied, the divider members can be readily removed and folded to the position shown in FIG. 4b. The collar can be lifted off the container and folded to one of the positions shown in FIGS. 3b or 3c. The base member can be laid out flat as illustrated in FIG. 2 and the empty carton returned to the fruit processing station for reuse.

DESCRIPTION OF OTHER EMBODIMENTS

Figure 5:
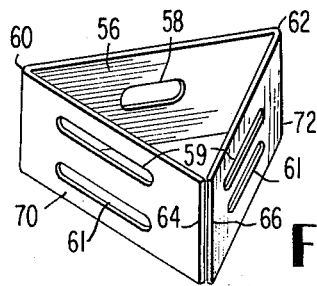
FIG. 5 is a pictorial view of a compartment divider member having an alternative construction.

When the added strength of the overlap portion 54 is not needed, the divider member 12 may take the form as illustrated in FIG. 5. The side 56 which has the hand engaging slot 58 is located between the two corners 60 and 62. The other side walls may have openings in the form of slots 59 and 61 which are sufficiently narrow as to prevent produce from spilling between compartments. The combined areas of slots 59 and 61 preferably are about equal to the area of hand engaging slot 58.

The ends 64 and 66 of the divider member may be unjoined so that the divider member can be easily unfolded to a flattened condition for storage or for shipping with an empty container. The length of the side walls 70 and 72 between corners 60 and 62 and their respective ends 64 and 66 should be such that when all the dividers are properly positioned, the slot 58 is located in alignment with the slots 16 in a side wall 22 and the ends 64 and 66 are urged together and against the corresponding parts of other dividers. This arrangement causes the container to resist sagging in the center by reason of compression loading of side walls 70 and 72. The same action is, of course, also provided by the divider member construction shown in FIGS. 4a and 4b.

FIG. 6 shows a plan view similar to FIG. 2 of the blank 74 for the base member where the side wall members have a trapezoidal shape defined by the fold line 78, the parallel marginal edge 80, and the cut edges 82 which lie along diagonals. Fold lines 84 are provided so that when the side wall members 76 are folded to their upright position, an additional folded surface 83 can be made.

As illustrated in FIG. 7, which is a view similar to FIG. 1, the additional folded surface provided in the side walls 76 will overlap the adjoining side walls when erected to provide two extra layers of sheet material, one from each adjoining side walls, at the corners of the base member 18. These additional layers of material improve the frictional contact due to compression between the divider members 88, the side walls 76, and the tension bands 86 in addition to giving strength at the corners of the container for vertical loading.

In FIG. 7, the encircling collar member of FIG. 3 is here shown to be replaced by tension bands 86 of an elastic material such, for example, as shock cords made of strips of rubber bands as are commercially available. The tension bands 86 serve to force the side wall members 76 inwardly against the compartments provided by the divider members 88. The divider members 88 may be similar in construction to that described in connection with FIGS. 4 or 5. Only three divider members, rather than six as shown in FIG. 1, are illustrated since they provide the same six compartments. The central portion support member 28 described in connection with FIGS. 1 and 2 may be used if desired; and optionally, six divider members of any suitable configuration may be used.

Referring now to FIG. 8, a top plan view of a further embodiment of the base member blank 90 is illustrated. The central portion of the base member 90 is provided with small apertures or holes 92 adapted to enhance air circulation which is desirable for citrus fruit in particular. Such apertures 92 may also be provided in the base member of FIG. 6, if desired.

On the bottom side of base member blank 90, risers 94 are provided which preferably are strips that run in a direction perpendicular to a flat side of the container. Risers 94 are separated to be spaced apart to allow the forks of a fork lift to fit between the strips. The height of risers 94 should be sufficient to raise the lower surface of the container above the floor or pallet support surface by an amount to allow the forks to easily slide under the container. The risers 94 may be made of the same material used for the base member or be of a pressed wood or plywood and secured as by an adhesive or fasteners or both to the bottom surface of base member 90.

In the embodiment of FIG. 8, the side wall members 96 with the slotted openings 98 are cut to have a rectangular shape as in the case of the embodiment of FIG. 2. However, the width of each side wall member is considerably shorter than a side of the container as illustrated in FIG. 9.

The divider members 12 may have a configuration as described in connection with FIGS. 4a and 4b.

With reference to FIGS. 8 and 9, the risers 94 may be in the form of four separate strips with two shorter members on the outboard side of the central strips. The central strips may advantageously extend somewhat beyond the fold lines 100 so that the collar 20 may be inserted over the top of the side wall members 96 down to a position resting on the upper surfaces of strips 94. Preferably, the outboard strips extend a similar distance beyond the fold lines 100 for the same reason. In addition, when the containers are stacked one on top of another, the strips 94 should advantageously engage as much as possible of the area on the upper surface of the supporting container thereby to better distribute the load and reduce the likelihood of stress concentration over a small area. The use of risers on the bottom of the containers described in connection with FIGS. 1 and 7 is also contemplated.

From the foregoing, it is apparent the invention provides a container efficiently utilizing structural wall materials. By reason of the novel dimensioning of the parts, the same materials traditionally used in containers for shipping fruit may be employed with each container holding safely nearly six times the fruit traditionally shipped in a single container. The container size allows for a reduction up to 75% of manpower previously required. The shape and size also provide improved performance in cold storage rooms where produce such as lemons, apples and grapes are commonly stored.

The shallow depth and compartment sizes limited by the triangularly shaped divider members reduce the tendency of the produce itself to injure the produce beneath it. In stores, a stack of the containers of the present invention becomes an attractive geometric island display.

The containers can be disassembled by untrained personnel and returned in a flat, space saving condition to the original shipper for reuse. The container may be easily assembled in the field and loaded there as easily as in the packing shed, and may be bulk filled by placing a new empty unit on a filled unit consecutively on top of one another when positioned on the arms of a fork-lift truck used to transport the filled containers to the shipping vehicle or cold storage room.

The present invention may be embodied in other specific forms without departing from the spirit or essential characteristics thereof. The presently disclosed embodiments are therefore intended to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and intended to be covered by Letters Patent is:

1. A reusable container comprising:
    a base member made of a foldable, non-metallic sheet material and having a polygonal central portion with a plurality of outer side walls joined thereto by fold lines which define the periphery of the base central portion;
    a continuous band of foldable, non-metallic sheet material frictionally engaging the outer side walls of said base member in an encircling relationship for maintaining said outer side walls in an upright position and being removable to fold the base member to a flattened condition for return shipment of the empty container after initial use of the container;
    said band having a width substantially equal to the height of said side walls whereby the band provides column support at the corners of the container; and
    a plurality of divider members made of a foldable, non-metallic sheet material formed as members separate from the base member and from each other, said divider members each having at least three wall sections joined by at least two substantially parallel fold lines to have the form of a triangle, said divider members being positioned inside said container with one wall section located adjacent the inside surface of one of said base member side walls, said divider member one wall section having a length substantially equal to the length of the adjacent container side wall thereby to locate two of said fold lines at corners of said base member and the other two wall sections along diagonal lines, each of said other two wall sections being in a substantially in-line relationship with opposed wall sections belonging to another divider member to provide reinforcement of the container and resist inward movement of side walls at the corners of the base member, said divider members being removable without destruction of the container and foldable to a flattened condition for return shipment of the empty container after initial use of the container;
    said base member, band, and divider members providing sufficient reinforcement to enable the container to carry contents weighing more than 150 pounds.

2. The container defined in claim 1, wherein said divider members are formed of flat sheet material having at least three fold lines, part of one wall section of each of said divider members having an overlapping portion with each overlapping portion being located at a different corner of said container, and all the divider members abutting together at the center of said container to provide triangular compartments having side walls that are substantially fixed.

3. The container as defined in claim 2, further comprising a center portion support member having one end secured to said base member at a position near the center thereof and extending substantially perpendicular to the base member along the height of a divider member with an end of the support member folded over the upper surface of said divider member to reduce sagging of the base central portion.

4. The container defined in claim 3, wherein said container has a hexagonal shape, the height of the container side walls is about 11 inches, the length of a side wall is about 20 inches and six divider members are positioned in said container and frictionally held snugly in place by said tension means, the upper edges of said tension band and said divider all lying substantially in the same plane as the upper edge of said container side walls.

5. The container defined in claim 4, wherein the container side walls each have hand engaging openings.

6. The container defined in claim 5, wherein the central portion of said base member contains and the divider member wall sections each contain apertures for ventilation.

7. The container defined in claim 6 together with a plurality of risers secured to the bottom surface of said base member, said risers being spaced apart to provide parallel slots for receiving lift truck forks, said slots having a direction perpendicular to one of said container side walls.

8. A reusable container comprising:
    a base member made of a foldable, non-metallic sheet material and having a polygonal central portion with a plurality of outer side walls joined thereto by fold lines which define the periphery of the base central portion;
    a continuous band of foldable, non-metallic sheet material frictionally engaging the outer side walls of said base member in an encircling relationship for maintaining said outer side walls in an upright position and being removable to fold the base member to a flattened condition for return shipment of the empty container after initial use of the container;

said band having a width substantially equal to the height of said side walls whereby the band provides column support at the corners of the container; and a plurality of divider members made of a foldable, non-metallic sheet material formed as members separate from the base member and from each other, said divider members each having at least three wall sections joined by at least two substantially parallel fold lines to have the form of a triangle, siad divider members being positioned inside said container with one wall section located adjacent the inside surface of one of said base member side walls, said divider member one wall section having a length substantially equal to the length of the adjacent container side wall thereby to locate two of said fold lines at corners of said base member and the other two wall sections along diagonal lines, each of said other two wall sections being in a substantially in-line relationship with opposed wall sections belonging to another divider member to provide reinforcement of the container and resist inward movement of side walls at the corners of the base member, said divider members being removable without destruction of the container and foldable to a flattened condition for return shipment of the empty container after initial use of the container;

said base member, band, and divider members providing sufficient reinforcement to enable the container to carry contents weighing about 200 pounds.

9. A reusable container comprising:

a base member made of a foldable, non-metallic sheet material and having a hexagonal central portion with six outer side walls joined thereto by fold lines which define the periphery of the base central portion, said side walls each having height of about 11 inches and a length of about 20 inches;

a continuous band of foldable, non-metallic sheet material frictionally engaging the outer side walls of said base member in an encircling relationship for maintaining said outer side walls in an upright position and being removable to fold the base member to a flattened condition for return shipment of the empty container after initial use of the container;

said band having a width of about eleven inches whereby the band provides column support at the corners of the container; and a plurality of divider members made of a foldable, non-metallic sheet material formed as members separate from the base member and from each other, said divider members each having at least three wall sections joined by at least two substantially parallel fold lines to have the form of a triangle, said divider members being positioned inside said container with one wall section located adjacent the inside surface of one of said base member side walls, said divider member one wall section having a length substantially equal to the length of the adjacent container side wall thereby to locate two of said fold lines at corners of said base member and the other two wall sections along diagonal lines, each of said other two wall sections being in a substantially in-line relationship with opposed wall sections belonging to another divider member to provide reinforcement of the container and resist inward movement of side walls at the corners of the base member, said divider members being removable without destruction of the container and foldable to a flattened condition for return shipment of the empty container after initial use of the container.

10. A reusable container comprising:

a base member made of a foldable, corrugated paperboard and having a hexagonal, vented central portion with six outer side walls joined thereto by fold lines which define the periphery of the base central portion, said side walls being about 20 inches long and about 11 inches high;

a continuous band of foldable, non-metallic sheet material frictionally engaging the outer side walls of said base member in an encircling relationship for maintaining said outer side walls in an upright position and being removable to fold the base member to a flattened condition for return shipment of the empty container after initial use of the container;

said band having a width of about eleven inches whereby the band provides column support at the corners of the container;

six divider members made of foldable corrugated paperboard and formed as members separate from the base member and from each other, said divider members each having at least three wall sections joined by at least two substantially parallel fold lines to have the form of a triangle, said divider members being positioned inside said container with one wall section located adjacent the inside surface of one of said base member side walls, said divider member one wall section having a length substantially equal to the length of the adjacent container side wall thereby to locate two of said fold lines at corners of said base member and the other two wall sections along diagonal lines, each of said other two wall sections being in a substantially in-line relationship with opposed wall sections belonging to another divider member to provide reinforcement of the container and resist inward movement of side walls at the corners of the base member, said divider members being removable without destruction of the container and foldable to a flattened condition for return shipment of the empty container after initial use of the container;

at least some of said side walls having openings that are aligned with openings in said band and said one divider wall sections when said container is in a fully erected condition to provide hand grips for the container; and a plurality of risers secured to the bottom surface of said base central portion, said risers being spaced apart to provide slot means for receiving lift truck forks.

11. A method of erecting and utilizing a container comprising the steps of:

providing a base member of a flat sheet of non-metallic foldable material having formed integrally therewith a plurality of outwardly extending portions joined to the base along fold lines defining a regular polygon;

folding said outwardly extending portions to an upright position to form a plurality of sidewalls which essentially surround the base;

encircling said sidewalls with a collar to prevent the sidewalls folding outwardly;

providing a plurality of divider members in the form of a flat sheet of non-metallic foldable material;

folding said divider members along at least two substantially parallel lines into the form of a triangle having one side substantially equal in length to the length of a sidewall and two sides substantially equal in length to one-half of a diagonal across said polygon;

installing said triangularly folded divider members as interior partitions with said one side of said divider members along a sidewall of said base member and with other two sides lying along the diagonals of the base, there being one corner of each triangularly folded member meeting at the approximate center of the container of the base member polygon;

depositing over 150 pounds of product within said container;

shipping said container to a predetermined destination point;

unloading the product from said container;

removing the triangularly folded members and placing them in a flattened condition;

removing said collar and folding said collar to a flattened condition;

folding said side walls downwardly into the plane of the base to thereby provide all of the material forming said container into a flattened form; and returning said flattened container material for refilling.

* * * * *